Dec. 3, 1929.  J. S. JUDELL ET AL  1,738,250

FAUCET VALVE

Filed Jan. 12, 1927

INVENTOR.
JULIUS S. JUDELL.
JACOB P. BITTEL.
BY
ATTORNEY.

Patented Dec. 3, 1929

1,738,250

UNITED STATES PATENT OFFICE

JULIUS S. JUDELL AND JACOB P. BITTEL, OF MILWAUKEE, WISCONSIN, ASSIGNORS TO THE MILWAUKEE FLUSH VALVE COMPANY, OF MILWAUKEE, WISCONSIN, A CORPORATION OF WISCONSIN

FAUCET VALVE

Application filed January 12, 1927. Serial No. 160,550.

This invention relates to valves for faucets of the built in types.

One object of the present invention is the provision of a valve through which the flow of water may be regulated without lengthwise movement of the valve stem and in which all the vital parts may be withdrawn through the head of the valve body for purposes of cleaning, replacement, or repair.

Other objects and advantages will appear from the following description of an illustrative embodiment of the present invention.

Figure 1:
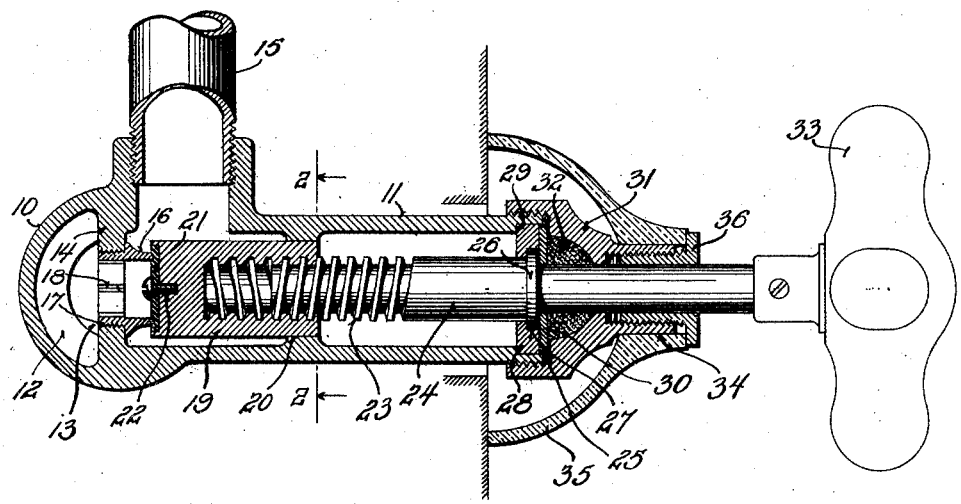
Figure 1 is a horizontal sectional view of a valve constructed in accordance with the present invention and shown embedded in the usual manner within a wall.
Figure 2:
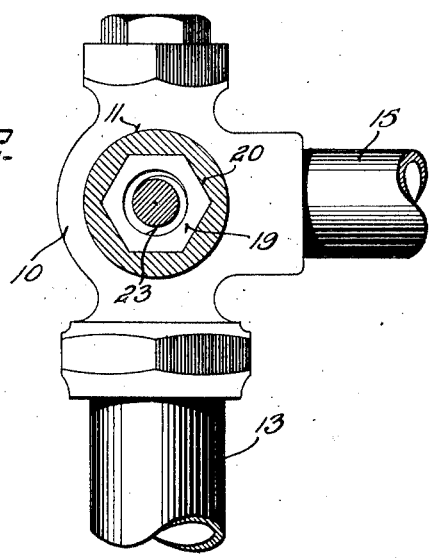
Fig. 2 is a sectional view on the line 2—2 of Figure 1.

The valve selected for illustration comprises a hollow body having a rounded base portion 10, which is ordinarily permanently embedded in the wall, and a neck portion 11 extending from the base portion 10 and adapted to project beyond the exterior surface $w$ of the wall. A chamber 12 within the portion 10 is open to an appropriate supply pipe 13 within the wall, and is separated from the interior of the neck portion by an integral partition 14 of appropriate form. A discharge pipe 15 leads from the neck portion 11 to an appropriate discharge nozzle not shown. The partition 14 is provided with an opening adapted to removably receive a valve seat, which in this instance is in the form of a ring 16 having a threaded shank 17 screwed into said opening. The valve seat is provided with internal grooves 18 or is otherwise fashioned to receive an appropriate tool by which the same may be unscrewed and removed through the neck 11 when desired. A plug 19 cooperating with the valve seat controls communication between the supply and discharge pipes 13 and 15.

The plug 19 is non-rotatively mounted within the neck portion 11 for reciprocation lengthwise thereof. In this instance the plug is of polygonal form and is fitted for lengthwise reciprocation in a polygonal guide passage 20 formed within the neck. The plug carries a valve disk 21, for cooperation with the seat 16, the disk in this instance being counter-sunk within the end of the plug and removably secured thereto by any appropriate means such as a screw 22. The other end of the plug is bored out and threaded to receive the threaded end 23 of a non-reciprocating stem 24 rotatably mounted within the neck 11 and projecting from the head end 25 thereof. The stem is provided with an integral collar 26 rotatably seated within a recess 27 formed in a washer 28, removably fixed within the head end of the neck 11, and forming a closure therefor. In this instance the washer 28 is seated against an internal shoulder 29 formed within the neck. The collar 26 is positively but removably retained within the recess 27 by a sealing washer 30 clamped against the closed end of the neck under the pressure of an appropriate nut 31, externally threaded upon the end of the neck. Appropriate packing 32 within the nut 31 precludes all possibility of leakage. The stem 24 carries the usual operating handle 33 of appropriate form.

The nut shown is provided with a tubular extension 34 adapted to receive a bell 35 of porcelain or the like designed to hide the valve body and the unsightly opening in the wall. The bell is removably retained in position against the wall by an appropriate flanged sleeve 36 threaded into the extension 34.

From the above it will be noted that the stem 24, though freely rotatable is firmly fixed against endwise movement. By virtue of the threaded engagement between the stem and the non-rotative plug, rotation of the stem produces lengthwise movement of the plug, with its valve disk 21, toward or from the valve seat ring 16, to thereby control communication between the supply and discharge pipes 13 and 15. It will be noted that all the parts are readily accessible without removing the valve body from the wall. After removing the bell 35, and nut 36 the stem 24, plug 19, and valve disk 21 are removable as a unit, after which the valve seat ring 16 may be readily removed. With this construction any repairs that may be found necessary may be readily taken care of without breaking the wall.

Various changes may be made in the embodiment of the invention hereinabove specifically described without departing from or sacrificing any of the advantages of the invention as defined in the appended claim.

We claim:

In the concealed plumbing fixture the combination of a body portion adapted for mounting in a wall and having inlet and outlet passages, a partition therebetween, an elongated neck on said body portion adapted to project beyond the wall, a valve seat removably retained in said partition, guide means in said neck portion adjacent said outlet passage, a valve plug free to reciprocate in said neck portion and retained against rotation by said guide means, a screw shaft engaging said plug to reciprocate the same, an integral collar on said shaft, a washer seated in the mouth of said neck portion, said washer having a recess to receive said integral collar on said shaft, a second washer of smaller diameter than said first washer adapted to cooperate with said first named washer to retain said stem against longitudinal movement, a packing nut threaded on said neck, packing within said nut cooperating therewith to seal the neck, a cover plate adapted to be positioned over said packing nut, and a nut in screw threaded engagement with said packing nut to retain said cover plate against the wall to conceal the fixture.

In witness whereof, we hereunto subscribe our names this 5th day of January, 1927.

JULIUS S. JUDELL.
JACOB P. BITTEL.